(12) United States Patent
Lee et al.

(10) Patent No.: US 9,702,757 B2
(45) Date of Patent: Jul. 11, 2017

(54) LIGHT MEASURING SYSTEM

(71) Applicant: SAMSUNG ELECTRONICS CO., LTD., Suwon-si (KR)

(72) Inventors: Joon Sub Lee, Seoul (KR); Seung Won Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 91 days.

(21) Appl. No.: 14/804,613

(22) Filed: Jul. 21, 2015

(65) Prior Publication Data

US 2016/0178431 A1 Jun. 23, 2016

(30) Foreign Application Priority Data

Dec. 18, 2014 (KR) .................. 10-2014-0183492

(51) Int. Cl.
| | |
|---|---|
| G01J 1/04 | (2006.01) |
| G01J 1/42 | (2006.01) |
| G01J 3/02 | (2006.01) |
| G01J 1/58 | (2006.01) |

(52) U.S. Cl.
CPC .............. *G01J 1/42* (2013.01); *G01J 3/0254* (2013.01); *G01J 1/58* (2013.01); *G01J 2001/0481* (2013.01); *G01J 2001/4252* (2013.01)

(58) Field of Classification Search
CPC ............. G01N 2201/065; G01N 21/55; G01N 2021/555; G01J 2001/4247
USPC ........................... 356/236, 213–226; 250/228
See application file for complete search history.

(56) References Cited

U.S. PATENT DOCUMENTS

| | | |
|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,734,959 B2 * | 5/2004 | Griffiths .................. G01J 1/42 |
| | | 356/236 |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |

(Continued)

FOREIGN PATENT DOCUMENTS

| | | |
|---|---|---|
| JP | 2004309323 A | 11/2004 |
| JP | 2007198983 A | 8/2007 |

(Continued)

*Primary Examiner* — Hoa Pham
(74) *Attorney, Agent, or Firm* — Sughrue Mion, PLLC

(57) ABSTRACT

A light measuring system including an integrating sphere having an aperture configured by opposing reflectors selectively aligned with complementary reflectors of at least one light source mounting block having a light source mounting region for mounting a light source thereon.

17 Claims, 11 Drawing Sheets

(56) References Cited

U.S. PATENT DOCUMENTS

| | | |
|---|---|---|
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 8,927,944 B2 * | 1/2015 | Solarz ............ G01R 31/44 250/459.1 |
| 9,347,824 B2 * | 5/2016 | McCord ............ G01J 1/0407 |
| 9,519,033 B2 * | 12/2016 | Solarz ............ G01R 31/44 |
| 2008/0054803 A1 * | 3/2008 | Zheng ............ H01L 33/50 313/506 |
| 2009/0039240 A1 * | 2/2009 | Van Nijnatten .... G01B 11/0633 250/223 B |
| 2009/0236506 A1 * | 9/2009 | Dudgeon ............ G01J 1/42 250/228 |
| 2011/0195531 A1 | 8/2011 | Sohn et al. |
| 2014/0084188 A1 | 3/2014 | Huang et al. |
| 2014/0268152 A1 * | 9/2014 | Morrow ............ G01N 21/66 356/402 |

FOREIGN PATENT DOCUMENTS

| | | |
|---|---|---|
| JP | 2012159457 A | 8/2012 |
| KR | 100721149 B1 | 5/2007 |
| KR | 1020110053031 A | 5/2011 |
| KR | 101049485 B1 | 7/2011 |
| KR | 101103890 B1 | 1/2012 |
| KR | 101184683 B1 | 9/2012 |
| KR | 101229904 B1 | 2/2013 |
| KR | 101308984 B1 | 9/2013 |
| KR | 1020130104046 A | 9/2013 |

\* cited by examiner

LIGHT MEASURING SYSTEM

CROSS-REFERENCE TO RELATED APPLICATION

This application claims priority from Korean Patent Application No. 10-2014-0183492 filed on Dec. 18, 2014, in the Korean Intellectual Property Office, the disclosure of which is incorporated herein by reference in its entirety.

BACKGROUND

Methods and apparatuses consistent with exemplary embodiments of the present disclosure relate to a light measuring system.

In general, integrating spheres are devices for averaging and measuring degrees of luminosity, as well as the light characteristics of light sources. A scheme in which a light source, a measurement object, is inserted into an integrating sphere to perform measurement thereon, may have advantages, such as a high degree of accuracy. However, such scheme may also have disadvantages, such as a relatively long measurement time and difficulty in adapting equipment used in an automated implementation.

In comparison, a scheme in which a light source, a measurement object, is positioned outwardly of an integrating sphere to be adjacent thereto, may have relative advantages, such as measurement automation and a reduction in measurement time. However, light in such alternative scheme may not be fully introduced into the integrating sphere and may be partially emitted outwardly of the integrating sphere, thereby leading to a decrease in a degree of accuracy.

SUMMARY

Aspects of the exemplary embodiments may enable automated measurement by positioning a light source outwardly of an integrating sphere while increasing a degree of accuracy by blocking light from being outwardly emitted.

According to an aspect of an exemplary embodiment, there is provided a light measuring system including: an integrating sphere comprising an aperture; a support part comprising at least one light source mounting block having a light source mounting region configured to mount a light source thereon, the support part configured to align the light source mounting region with the aperture of the integrating sphere; a light meter configured to measure a light characteristic of light emitted by the light source; and a reflector disposed between the aperture of the integrating sphere and the light source mounting block, the reflector comprising a plurality of reflector plates arranged around the light source mounting region.

The plurality of reflector plates may include a first reflector plate mounted on the light source mounting block and a second reflector plate mounted on the integrating sphere.

The first reflector plate and the second reflector plate may be configured to allow for a movement path of the light source mounting block.

The first reflector plate may be a pair of first reflector plates opposing each other, the pair of first reflector plates being arranged in a first direction that is a direction of movement of the light source mounting block, wherein the light source mounting region is interposed between the pair of first reflector plates.

The pair of first reflector plates facing each other may be mounted on the light source mounting block at an angle inclined toward the integrating sphere.

The second reflector plate may be configured as a pair of second reflector plates opposing each other, the pair of second reflector plates being arranged in a second direction perpendicular to the first direction, wherein the aperture is interposed between the pair of second reflector plates.

The second reflector plates may be extended from the integrating sphere to the support part, and wherein the second reflector plates are mounted on the integrating sphere at an angle such that a distance between the second reflector plates at a point of mounting to the integrating sphere is less than a distance between distal ends of the second reflector plates.

The distance between the second reflector plates may be greater than widths of the first reflector plates facing each other.

The support part may include a plurality of light source mounting blocks and may be configured such that light source mounting regions of the respective light source mounting blocks are sequentially aligned with the aperture of the integrating sphere.

The support part may further include a rotatably driven rotating body, and the plurality of light source mounting blocks may be radially arranged on a circumferential portion of the rotating body.

The light measuring system may further include: a driving device connected to the rotating body and configured to rotate the rotating body to align the light source mounting regions of respective light source mounting blocks with the aperture of the integrating sphere.

The light source may be a light emitting diode (LED) chip or an LED package in which the LED chip is mounted.

The light source may further include a wavelength conversion layer covering the LED chip.

According to another aspect of an exemplary embodiment, there may be provided a light measuring system may including: an integrating sphere comprising an aperture; a support part comprising a plurality of light source mounting blocks respectively comprising light source mounting regions configured to mount a light source thereon, the support part configured to move the plurality of light source mounting blocks along a first direction and align the respective light source mounting regions with the aperture of the integrating sphere; a light meter configured to measure a light characteristic of light emitted by the light sources; and a reflector including first reflector plates disposed in each of the plurality of light source mounting blocks and arranged in the first direction, and second reflector plates disposed on the integrating sphere around the aperture and arranged in a second direction perpendicular to the first direction.

The first reflector plates and the second reflector plates may be separated from each other.

BRIEF DESCRIPTION OF DRAWINGS

The above and other aspects will be more clearly understood from the following detailed description taken in conjunction with the accompanying drawings, in which.

DETAILED DESCRIPTION

Figure 1:
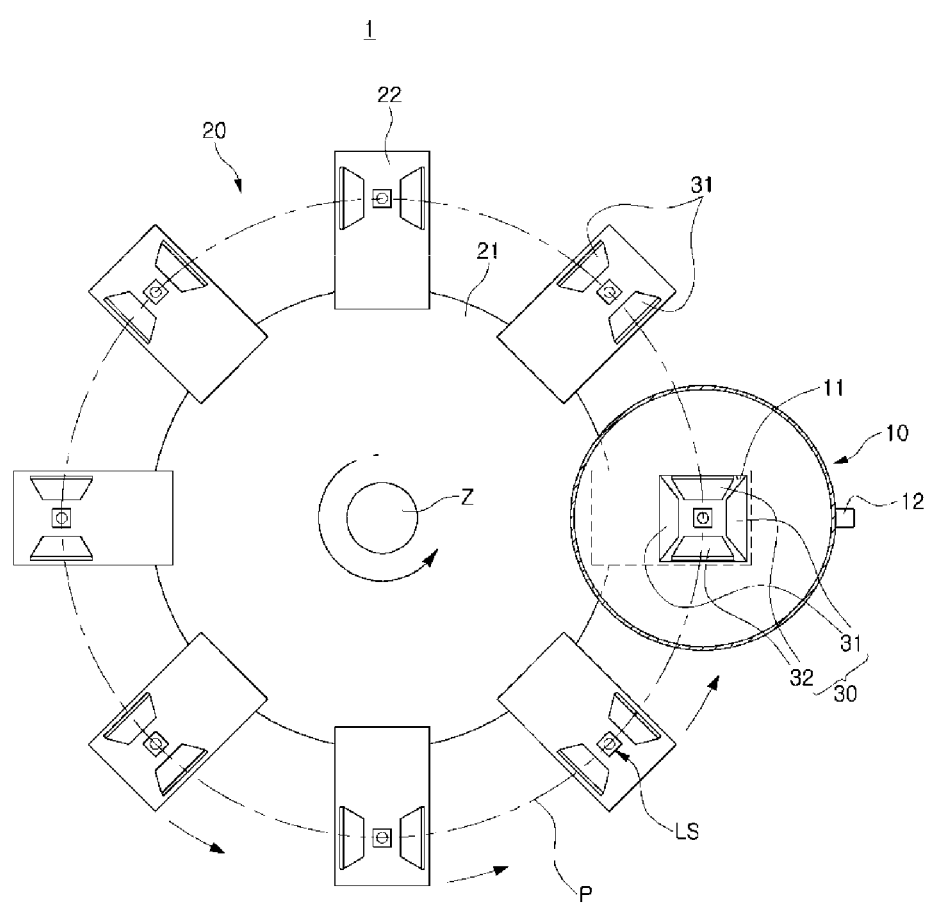
FIG. 1 is a schematic plan view of a light measuring system according to an exemplary embodiment.

Exemplary embodiments will now be described more fully with reference to the accompanying drawings. The present disclosure may, however, be embodied in different forms and should not be construed as limited to the exemplary embodiments set forth herein. Rather, these exemplary embodiments are provided so that this disclosure is thorough and complete and fully conveys the present disclosure to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Similarly, expressions such as "at least one of" do not necessarily modify an entirety of a following list and do not necessarily modify each member of the list, such that "at least one of a, b, and c" should be understood as including only one of a, only one of b, only one of c, or any combination of a, b, and c.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, when an exemplary embodiment can be implemented differently, functions or operations described in a particular block may occur in a different way from a flow described in the flowchart. For example, two consecutive blocks may be simultaneously performed, or the blocks may be performed in reverse according to related functions or operations.

A light measuring system according to an exemplary embodiment will be described with reference to FIG. 1 through FIG. 3.

FIG. 1 is a schematic plan view of a light measuring system according to an exemplary embodiment. FIG. 2 is a cross-sectional view of the light measuring system illustrated in FIG. 1. FIG. 3 is a plan view schematically illustrating an enlarged state of an aperture of an integrating sphere.

Figure 2:
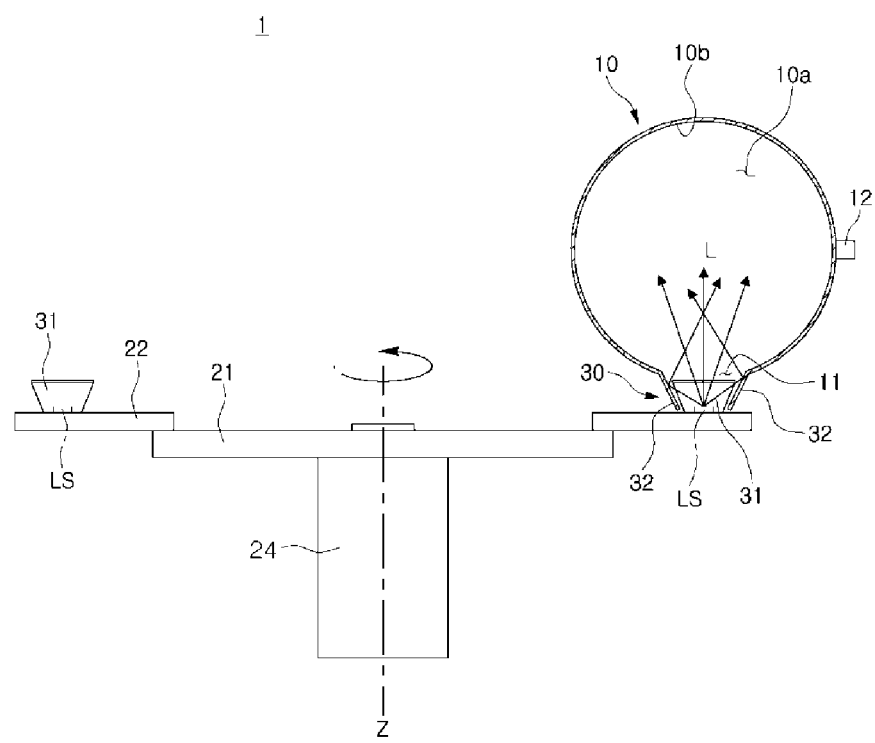
FIG. 2 is a cross-sectional view of the light measuring system illustrated in FIG. 1.
Figure 3:
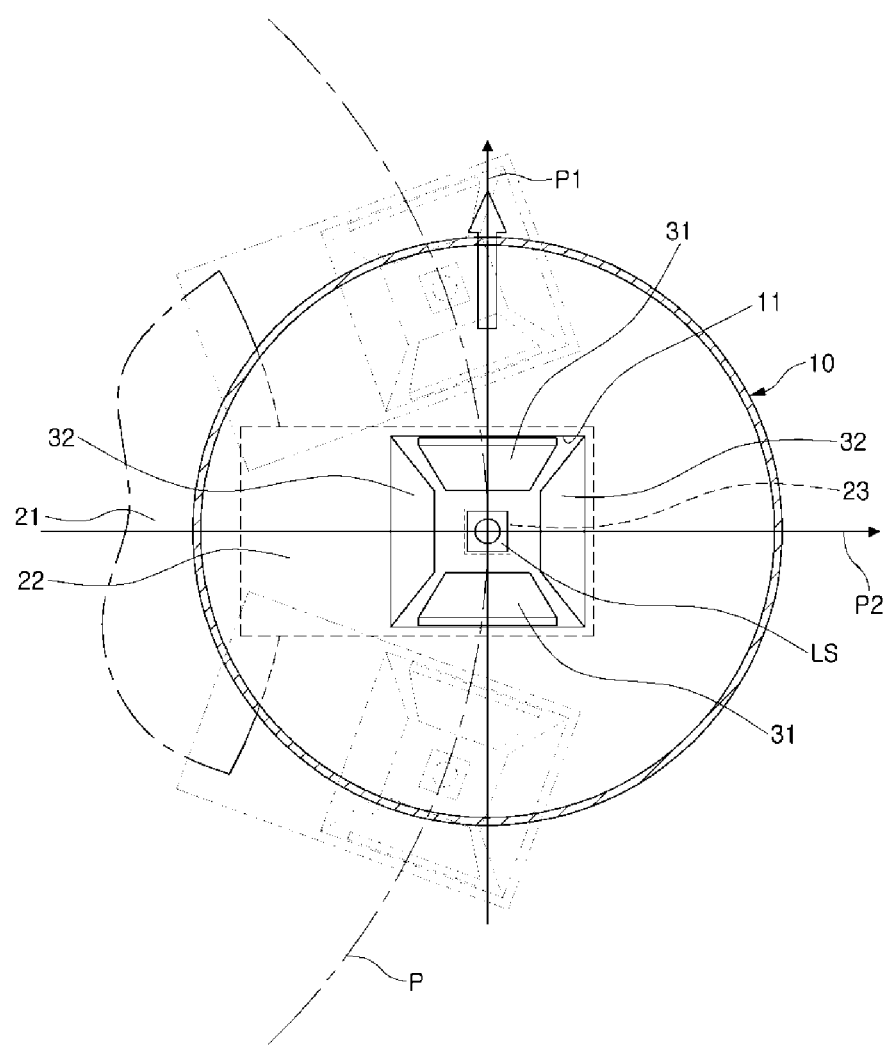
FIG. 3 is a plan view schematically illustrating an enlarged state of an aperture of an integrating sphere.

Referring to FIG. 1 through FIG. 3, a light measuring system 1 according to an exemplary embodiment may be configured to include an integrating sphere 10, a support part 20, a light meter 12, and a reflector 30.

The integrating sphere 10 may have a substantially spherical structure enclosing an empty or hollow space 10a therein and may receive light L from a light source LS in the empty space 10a to thereby measure characteristics of the light L. The light L introduced into the internal space 10a of the integrating sphere 10 may be continuously diffused and reflected within the integrating sphere 10, such that intensity of the introduced light L and light characteristics thereof within the internal space 10a may be averaged.

An interior surface 10b of the integrating sphere 10 may be formed of or coated with a material effectively diffusing and reflecting light. The coating material may include, for example, barium sulfate (BaSO4), silver (Ag), rhodium (Rh) and the like.

The integrating sphere 10 may have an aperture 11 configured to receive the light L for introduction into the internal space 10a. The aperture 11 may be provided in a lower portion of the integrating sphere 10 facing the light source LS, but the relationship between aperture 11 may be alternatively provided such that the aperture faces the light source LS. A size of the aperture 11 may be greater than a size of the light source LS. The aperture 11 may be positioned directly above the light source LS and be opened to the light source LS.

Although FIG. 3 illustrates a case in which the aperture 11 has a quadrangular structure, the shape of the aperture 11 is not limited thereto and may be variously formed to have a shape other than a quadrangular shape.

The light meter 12 measuring the light L emitted from the light source LS may be mounted on the integrating sphere 10. The light meter 12 may be implemented as a photo detector or a spectrometer for measuring light characteristics of the light L introduced to the integrating sphere 10.

The characteristics of the light L able to be measured by the light meter 12 may include, for example, luminance, wavelengths, luminous flux, luminosity (luminous intensity), illuminance, spectrum distribution, color temperature, and the like.

The support part 20 may move along a predetermined movement path and may allow the light source LS to be disposed in or aligned with the aperture 11, such that the light L may be irradiated into the internal space 10a of the integrating sphere 10.

As illustrated in FIGS. 1 and 2, the support part 20 may be configured to include a rotating body 21, a plurality of light source mounting blocks 22 radially arranged in a circumferential portion of the rotating body 21, and driving devices 24.

The rotating body 21 may be connected to the driving devices 24 and may be rotatably driven, for example by a motor. By the rotational driving of the rotating body 21, each of the plurality of light source mounting blocks 22 may be sequentially disposed below or aligned with the integrating sphere 10. That is, the plurality of light source mounting blocks 22 may have a movement path P tracing a circular path centered on a rotational center Z of the rotating body 21. In addition, the integrating sphere 10 may be positioned along the movement path P.

On each of the plurality of light source mounting blocks 22, the light source LS may be disposed and may be supported thereby. In addition, each light source mounting block 22 may have a light source mounting region 23 configured to receive the light source LS for mounting the light source LS provided as a measurement object thereon.

Each of the plurality of light source mounting blocks 22 may move in accordance with the rotation of the rotating body 21 in a state in which the light source LS is mounted on an upper surface of each light source mounting block 22, such that the light source mounting regions 23 of the respective light source mounting blocks 22 may be sequentially disposed below or aligned with the integrating sphere 10. In this case, the light source LS mounted to each light source mounting block 22 may be disposed in a position facing and aligned with the aperture 11 of the integrating sphere 10 for emission of light L into the internal space 10a of the integrating sphere 10, as discussed above.

A circuit wiring electrically connected to the light source LS may be provided on the light source mounting region 23. Thus, the light source LS mounted to the light source mounting region 23 may be electrically connected to the circuit wiring and may emit light by power supplied from a power supply through the circuit wiring.

The exemplary embodiment illustrates a case in which the plurality of light source mounting blocks 22 of the support part 20 are sequentially positioned below the aperture of the integrating sphere 10 by the rotation of the rotating body 21, but the configuration is not limited thereto. Although not illustrated in the drawings, the plurality of light source mounting blocks 22 may move linearly along a linear movement path, for example, and may be sequentially disposed below the aperture 11.

The reflector 30 may be positioned between the aperture 11 of the integrating sphere 10 and the light source mounting block 22. The reflector 30 may reflect the light L of the light source LS and allow the light to be completely introduced into the integrating sphere 10. Such an operation may prevent the light emitted from the light source LS from being emitted outside of the integrating sphere 10.

The reflector 30 may have a structure having a plurality of divided portions. In addition, the reflector 30 may be arranged to enclose the light source LS between the aperture 11 of the integrating sphere 10 and the light source mounting block 22.

In detail, the reflector 30 may include a plurality of divided reflector plates, and the plurality of reflector plates may include first reflector plates 31 and second reflector plates 32. Among the plurality of divided reflector plates, the first reflector plates 31 may be mounted on the support part 20 and the second reflector plates 32 may be mounted on or integral to the integrating sphere 10. In addition, the first reflector plates 31 and the second reflector plates 32 may be separated from each other and may not be connected to each other.

Figure 4A:
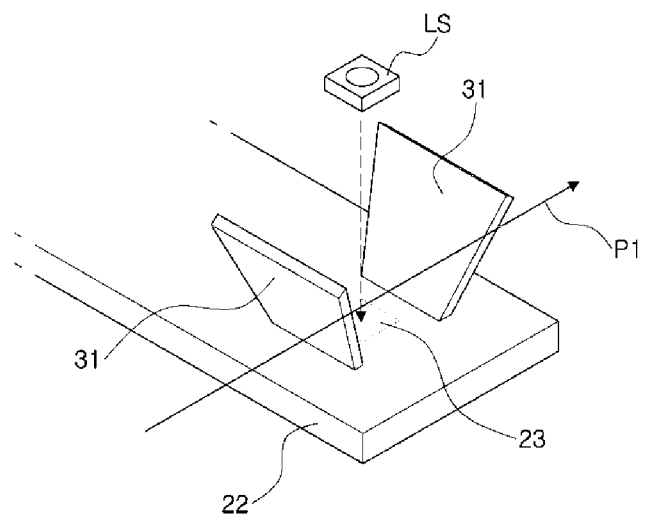
FIG. 4A is a perspective view schematically illustrating a light source mounting block provided with first reflector plates from FIG. 1.
Figure 4B:
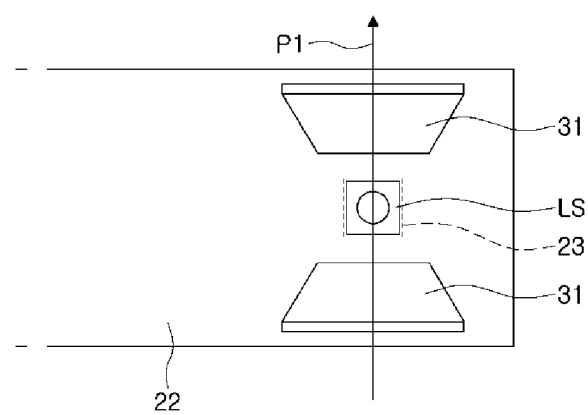
FIG. 4B is a plan view of the light source mounting block illustrated in FIG. 4A.
Figure 4C:
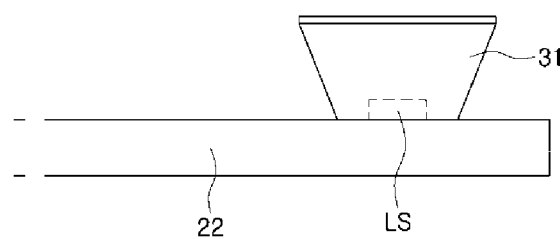
FIG. 4C is a cross-sectional view of the light source mounting block illustrated in FIG. 4A.

FIGS. 4A through 4C schematically illustrate the first reflector plates 31 mounted on the light source mounting block 22.

As illustrated in FIGS. 4A through 4C, the first reflector plates 31 may be configured as a pair of first reflector plates. In addition, the first reflector plates 31 may be arranged in a first direction P1, a direction of movement of the light source mounting block 22, with the light source mounting region 23 interposed between the first reflector plates 31. Here, the first direction P1 may correspond to a tangent direction of the movement path P.

The first reflector plates 31 may be extended to the integrating sphere 10 positioned on an upper portion of the support part 20 and may be mounted to the support part 20 at an angle in such a manner that a distance between the first reflector plates 31 facing each other may increase toward distal end portions of the first reflector plates 31.

Figure 5A:
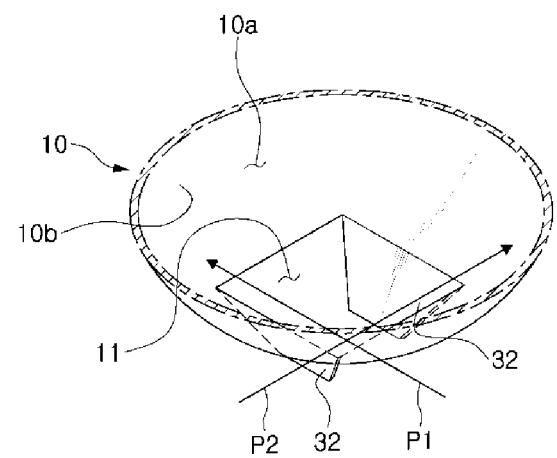
FIG. 5A is a perspective view schematically illustrating the aperture of the integrating sphere provided with second reflector plates from FIG. 1.
Figure 5B:
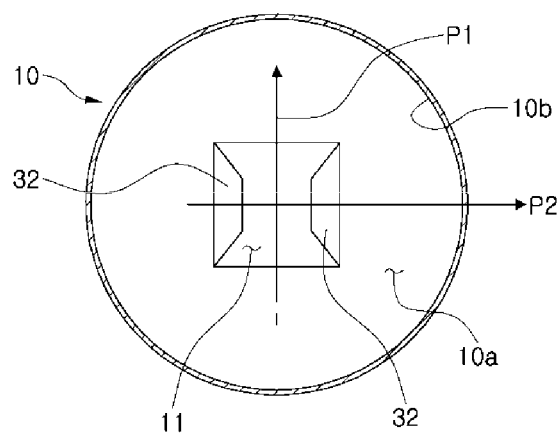
FIG. 5B is a plan view of the integrating sphere illustrated in FIG. 5A.
Figure 5C:
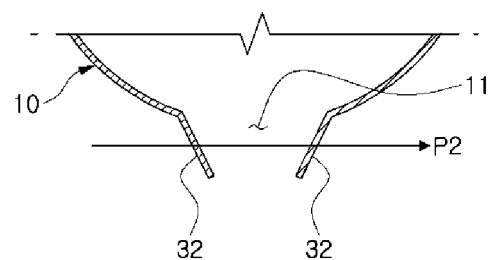
FIG. 5C is a cross-sectional view of the integrating sphere illustrated in FIG. 5A.

FIGS. 5A through 5C schematically illustrate the second reflector plates 32 mounted in the aperture 11 of the integrating sphere 10.

As illustrated in FIGS. 5A through 5C, the second reflector plates 32 may be configured as a pair of reflector plates, similar to the first reflector plates 31. The second reflector plates 32 may be spaced apart from each other in a second direction P2 perpendicular with respect to the first direction P1, with the aperture 11 interposed between the second reflector plates 32. Here, the second direction P2 may correspond to a direction in which centrifugal force of the rotating body 21 acts.

The second reflector plates 32 may be extended to the light source mounting block 22 of the support part 20 positioned on a lower portion of the integrating sphere 10 and may be mounted to the integrating sphere 10 at an angle in such a manner that a distance between the second reflector plates 32 facing each other decreases toward distal end portions of the second reflector plates 32. In this case, the distance between the second reflector plates 32 facing each other may be greater than widths of the first reflector plates 31. Thus, in the case that the first reflector plates 31 are positioned between the second reflector plates 32, the first reflector plates 31 may pass between the second reflector plates 32, in the first direction P1.

In this manner, the first reflector plates 31 and the second reflector plates 32 according to the exemplary embodiment may be divided and separated from each other. In addition, the first reflector plates 31 and the second reflector plates 32 may be respectively separated from each other and may be mounted on the integrating sphere 10 and the support part 20.

In particular, each of the first reflector plates 31 and the second reflector plates 32 may be configured as a pair of reflector plates. In the aperture 11, the first reflector plates 31 may be arranged to face each other in the first direction P1 and the second reflector plates 32 may be arranged to face each other in the second direction P2, substantially perpendicular with respect to the first direction P1 accounting for the radius of rotation of the combined length of the rotating member 21 and the light source mounting block 22. That is, the first reflector plates 31 and the second reflector plates 32 may be disposed to cross each other, whereby the light source LS positioned in a central portion of the aperture 11 may be substantially enclosed by the first and second reflector plates 31 and 32. Thus, even in the case that the support part 20 and the integrating sphere 10 are separated from each other by a predetermined distance, the light L emitted from the light source LS may be reflected by the reflector 30 positioned between the integrating sphere and the support part 20 and may be introduced into the internal space 10a of the integrating sphere 10 through the aperture 11.

In addition, the first reflector plates 31 and the second reflector plates 32 may be disposed to allow for the movement path P of the light source mounting block 22. In particular, because the second reflector plates 32 are not positioned on the movement path P, the second reflector plates 32 may not interfere with the first reflector plates 31 during the movement of the light source mounting block 22. That is, because a pair of the second reflector plates 32 are spaced apart from each other in the second direction P2, perpendicular with respect to the first direction P1, they may be open in the first direction P1. Thus, the first reflector plates 31 may pass between the second reflector plates 32, in the first direction P1, as illustrated in FIG. 3.

Operations of the light measuring system 1 as described above will be described. The light source LS manufactured through a variety of manufacturing processes may be disposed on the light source mounting region 23 of each light source mounting block 22. In this case, the light source LS may be disposed between a pair of the first reflector plates 31 mounted on each light source mounting block 22.

Each of the plurality of light source mounting blocks 22 may be sequentially positioned to a lower portion of the integrating sphere 10 by the rotating body 21 of the support part 20 rotating at a predetermined interval and angle, and the light source mounting region 23 may be disposed below the aperture 11 of the integrating sphere 10.

As illustrated in FIG. 3, in the case that the light source mounting block 22 is disposed below the aperture 11 of the integrating sphere 10, the pair of first reflector plates 31 mounted on the light source mounting block 22 and the pair of second reflector plates 32 mounted on the integrating sphere 10 may be disposed around the light source LS while enclosing the light source LS. In particular, because the pair of second reflector plates 32 may be disposed in parallel with each other in a direction crossing the first reflector plates in the aperture 11, and may not be positioned on the movement path P of the light source mounting block 22, the first reflector plates 31 may not interfere with the second reflector plates 32 and may pass between the second reflector plates 32.

The light source LS may emit the light L when receiving driving power transferred through the light source mounting block 22, and the consequently emitted light L may be reflected by the first and second reflector plates 31 and 32 and may be completely introduced into the internal space 10a of the integrating sphere 10 through the aperture 11.

When measurement of light L emitted by the light source LS is complete, a corresponding light source mounting block 22 may be moved from the integrating sphere 10 and the next light source mounting block 22 may be moved and disposed below the integrating sphere 10. A series of operations are continuously conducted, and hence the measurement of the light sources LS may be promptly performed.

As described above, in the light measuring system 1 according to the exemplary embodiment, each of the light source mounting blocks 22 on which the light source LS provided as a measurement object is placed may be moved for sequentially positioning below the integrating sphere 10 by the rotation of the rotating body 21, such that a consecutive measurement process and a reduction in measurement time may be easily implemented.

In addition, the first and second reflector plates 31 and 32, separated from each other, may be disposed between the integrating sphere 10 and the light source mounting block 22 to thereby block the light L from being discharged outside of the integrating sphere 10.

In particular, the first reflector plates 31 may be mounted on the light source mounting block 22 moving along the movement path P. The second reflector plates 32 may be mounted on the integrating sphere 10 around the aperture 11 while crossing the first reflector plates 31 in such a manner that the second reflector plates 32 are not positioned on the movement path P, whereby interference between the second reflector plates 32 and the first reflector plates 31 may be blocked. As a result, an efficient measurement process may be implemented.

The light source LS may be placed on the light source mounting region 23 of the light source mounting block 22 and may irradiate the light L into the integrating sphere 10. The light source LS may be a photoelectric device generating light having a predetermined wavelength by driving power applied from the outside. For example, the light source LS may include a semiconductor light emitting diode (LED) chip including an n-type semiconductor layer and a p-type semiconductor layer, and an active layer interposed therebetween, or an LED package on which the LED chip is mounted.

The light source LS may emit blue light, green light, or red light in accordance with a material contained therein or a combination thereof with a phosphor, and may emit white light, ultraviolet light, or the like.

Figure 6A:
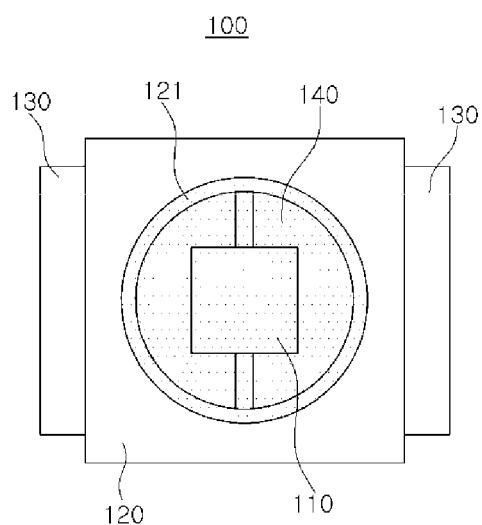
FIG. 6A is a plan view schematically illustrating a light source according to an exemplary embodiment.
Figure 6B:
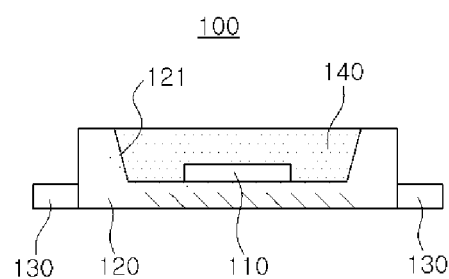
FIG. 6B is a cross-sectional view of the light source illustrated in FIG. 6A.

FIGS. 6A and 6B schematically illustrate a light source according to an exemplary embodiment.

As illustrated in FIGS. 6A and 6B, a light source 100 may have a package structure in which an LED chip 110 is mounted within a body 120 having a reflective cup 121.

The body 120 may correspond to a base member on which the LED chip 110 is mounted and is supported thereby, and may be formed of a white molding compound having a high degree of light reflectance, whereby effects of increasing the quantity of outwardly emitted light by reflecting light emitted from the LED chip 110 may be provided. Such a white molding compound may contain a thermosetting resin having high heat resistance or a silicon resin. In addition, a white pigment and filler, a curing agent, a release agent, an antioxidant, an adhesion improver, or the like may be added to a thermoplastic resin. In addition, the white molding compound may be formed of FR-4, CEM-3, an epoxy material, a ceramic material or the like. Further, the white molding compound may be formed of a metal such as aluminum (Al).

The body 120 may be provided with lead frames 130 for forming an electrical connection with an external power source. The lead frames 130 may be formed of a material, for example, a metal such as aluminum, copper or the like, having excellent electrical conductivity. In a case in which the body 120 is formed of a metal, an insulating material may be interposed between the body 120 and the lead frames 130.

The lead frames 130 may be exposed to the reflective cup 121 of the body 120 through a bottom surface of the reflective cup 121 on which the LED chip 110 is mounted. The LED chip 110 may be electrically connected to the exposed lead frames 130.

A cross-section of the reflective cup 121 exposed to an upper surface of the body 120 may be greater than that of the bottom surface of the reflective cup 121. Here, the cross-section of the reflective cup 121 exposed to the upper surface of the body 120 may be defined as a light emitting surface of the light source 100.

Meanwhile, the LED chip 110 may be enclosed by a wavelength conversion layer 140 formed within the reflective cup 121 of the body 120. The wavelength conversion layer 140 may contain a wavelength conversion material.

The wavelength conversion material may contain at least one or more phosphors excited by light generated by the LED chip 110 and emitting light of different wavelengths. By doing so, various colors of light, as well as white light, may be emitted.

For example, in a case in which the LED chip 110 emits blue light, white light may be emitted by combining yellow, green, red, and/or orange colored phosphors. In addition, the LED chip 110 may be configured to include at least one LED chip emitting violet, blue, green, red or ultraviolet light. In this case, a color rendering index (CRI) of the LED chip 110 may be adjusted from about 40 to 100, and the LED chip 110 may generate various types of white light with color temperatures ranging from about 2000K to 20000K. Also, if necessary, the LED chip 110 may generate visible violet, blue, green, red or orange light or invisible infrared light to adjust the color of light according to a desired atmosphere and a user mood. Also, the LED chip 110 may generate a specific wavelength of light for accelerating growth of plants.

Figure 8:
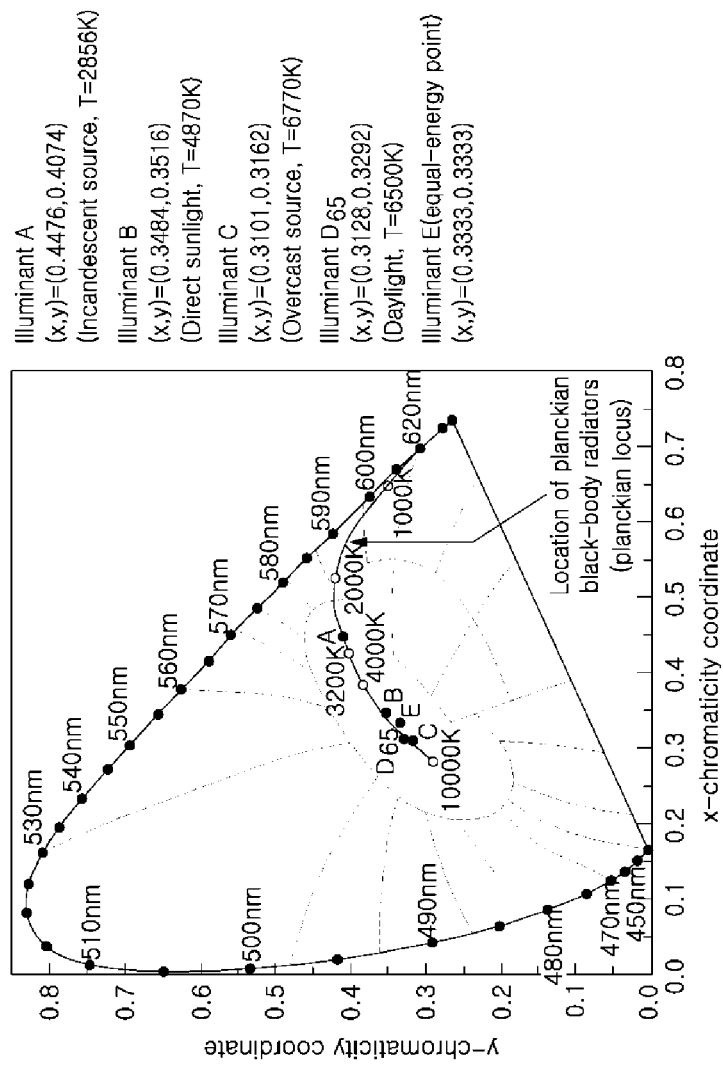
FIG. 8 is the CIE 1931 coordinate system for explaining a wavelength conversion material employable in an exemplary embodiment.

White light formed by combining yellow, green, red phosphors with the blue LED and/or combining green and red LEDs may have two or more peak wavelengths, and coordinates (x, y) thereof in the CIE 1931 coordinate system of FIG. 8 may be positioned on a line segment connecting (0.4476, 0.4074), (0.3484, 0.3516), (0.3101, 0.3162), (0.3128, 0.3292), and (0.3333, 0.3333). Alternatively, coordinates (x, y) thereof in the CIE 1931 coordinate system may be positioned in a region surrounded by the line segment and blackbody radiation spectrum. The color temperature of white light may range from about 2000K to 20000K.

The phosphors may have the following compositional formulae and colors.

Oxides: yellow and green $Y_3Al_5O_{12}$:Ce, $Tb_3Al_5O_{12}$:Ce, $Lu_3Al_5O_{12}$:Ce Silicates: yellow and green $(Ba,Sr)_2SiO_4$:Eu, yellow and orange $(Ba,Sr)_3SiO_5$:Ce Nitrides: green β-SiAlON:Eu, yellow $La_3Si_6N_{11}$:Ce, orange α-SiAlON:Eu, red $CaAlSiN_3$:Eu, $Sr_2Si_5N_8$:Eu, $SrSiAl_4N_7$:Eu, $SrLiAl_3N_4$:Eu, $Ln_{4-x}(Eu_zM_{1-z})_xSi_{12-y}Al_yO_{3+x+y}N_{18-x-y}$ ($0.5 \leq x \leq 3$, $0 < z < 0.3$, $0 < y \leq 4$) (where, Ln is at least one element selected from a group consisting of group IIIa elements and rare-earth elements, and M is at least one element selected from a group consisting of Ca, Ba, Sr and Mg)

Fluorides: KSF based red $K_2SiF_6$:$Mn^{4+}$, $K_2TiF_6$:$Mn^{4+}$, $NaYF_4$:$Mn^{4+}$, $NaGdF_4$:$Mn^{4+}$ The phosphor composition may substantially accord with stoichiometry and respective elements may be substituted with other elements within respective groups in a periodic table of the elements. For example, Sr may be substituted with Ba, Ca, Mg or the like within the alkaline earth group (II) and Y may be substituted with lanthanum (La) based elements such as Tb, Lu, Sc, Gd or the like. In addition, Eu or the like, an activator, may be substituted with Ce, Tb, Pr, Er, Yb or the like according to a desired energy level. The activator may be used alone or a sub-activator or the like may be added in order to allow for modification of properties.

Further, as a material for substituting for the phosphor, a material such as a quantum dot (QD) or the like may be used, and the QD or the phosphor may be used alone or a combination of the phosphor and the QD may be used.

The quantum dot (QD) may be configured to have a core (radius: 3~10 nm) formed of CdSe, InP, or the like, a shell (thickness: 0.5~2 nm) formed of ZnS, ZnSe or the like, and a ligand structure stabilizing the core and the shell, and may implement various colors depending on a size thereof.

The exemplary embodiment illustrates a case in which the light source 100 has a package structure and the LED chip 110 is provided within the body 120 having the reflective cup 121, but the configuration is not limited thereto.

Figure 7A:
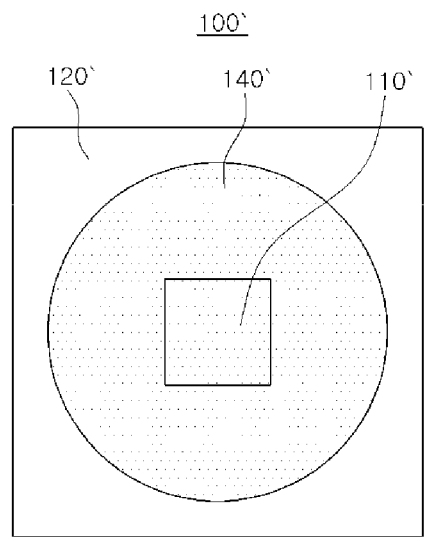
FIG. 7A is a plan view schematically illustrating a modified example of the light source illustrated in FIG. 6A.
Figure 7B:
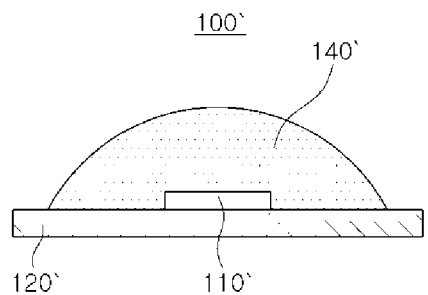
FIG. 7B is a cross-sectional view schematically illustrating a modified example of the light source illustrated in FIG. 6B.

FIGS. 7A and 7B illustrate a modified light source.

As illustrated in FIGS. 7A and 7B, a light source 100' may have a chip on board (COB) structure in which an LED chip 110' is mounted on an upper surface of a body 120'. In this case, the body 120' may be a circuit board provided with a circuit wiring and an encapsulating structure 140' may be provided, such as a lens structure protruded upwardly from the upper surface of the body 120' and covering the LED chip 110'.

Meanwhile, the exemplary embodiment illustrates a case in which the light source 100 is provided as a single package, but the present configuration is not limited thereto. For example, the light source 100 may be the LED chip 110 itself.

Various examples of a light emitting diode (LED) chip according to an exemplary embodiment will be described with reference to FIG. 9 through FIG. 11.

Figure 9:
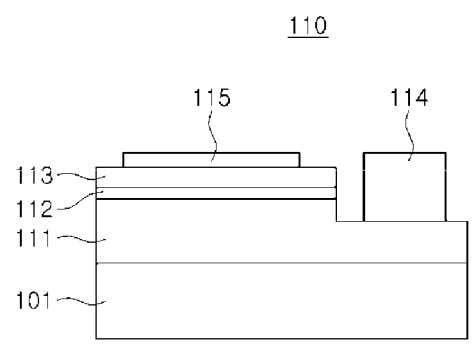
FIGS. 9 through 11 are cross-sectional views illustrating examples of a light emitting diode chip usable as a light source.
Figure 10:
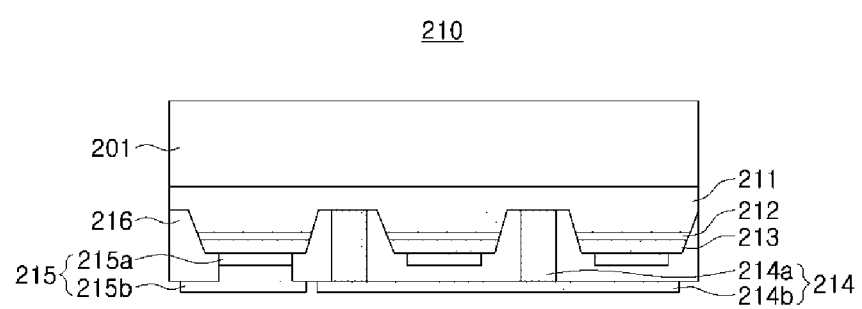
Figure 11:
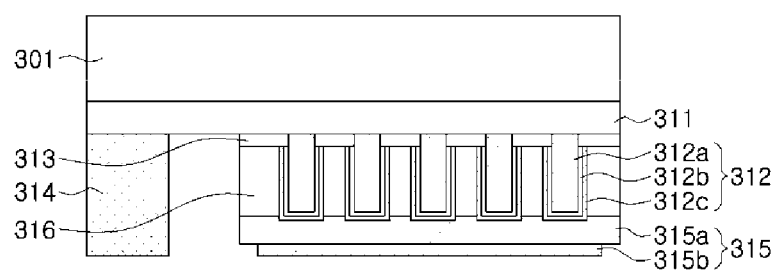

FIG. 9 through FIG. 11 are cross-sectional views illustrating various examples of the LED chip usable as a light source.

Referring to FIG. 9, the LED chip 110 may include a first conductivity type semiconductor layer 111, an active layer 112, and a second conductivity type semiconductor layer 113 sequentially stacked on a growth substrate 101.

The first conductivity type semiconductor layer 111 stacked on the growth substrate 101 may be an n-type nitride semiconductor layer doped with n-type impurities. The second conductivity type semiconductor layer 113 may be a p-type nitride semiconductor layer doped with p-type impurities. However, according to exemplary embodiments, the first and second conductivity type semiconductor layers 111 and 113 may be stacked in a state in which positions thereof are altered. The first and second conductivity type semiconductor layers 111 and 113 may have a compositional formula of $Al_xIn_yGa_{(1-x-y)}N$ (where, $0 \leq x<1$, $0 \leq y<1$, $0 \leq x+y<1$), and a material having such a composition may be, for example, GaN, AlGaN, InGaN, AlInGaN or the like.

The active layer 112 disposed between the first and second conductivity type semiconductor layers 111 and 113 may emit light having a predetermined level of energy due to the recombination of electrons and holes. The active layer 112 may contain a material having an energy band gap level lower than that of the first and second conductivity type semiconductor layers 111 and 113. For example, in a case in which the first and second conductivity type semiconductor layers 111 and 113 are formed of a GaN based compound semiconductor, the active layer 112 may contain an InGaN based compound semiconductor having an energy band gap level lower than an energy band gap level of GaN. In addition, the active layer 112 may have a multiple quantum well (MQW) structure in which quantum well and quantum barrier layers are alternately stacked, for example, an InGaN/GaN structure. However, the present configuration is not limited thereto, and the active layer 112 may have a single quantum well (SQW) structure.

The LED chip 110 may include first and second electrode pads 114 and 115 electrically connected to the first and second conductivity type semiconductor layers 111 and 113, respectively. The first and second electrode pads 114 and 115 may be exposed and disposed in the same direction. In addition, the LED chip 110 may be electrically connected to the substrate in a wire bonding scheme or flip chip bonding scheme.

An LED chip 210 shown in FIG. 10 may include a semiconductor laminate formed on a growth substrate 201. The semiconductor laminate may include a first conductivity type semiconductor layer 211, an active layer 212, and a second conductivity type semiconductor layer 213.

The LED chip 210 may include first and second electrode pads 214 and 215 electrically connected to the first and second conductivity type semiconductor layers 211 and 213, respectively.

The first electrode pad 214 may include a conductive via 214a penetrating through the second conductivity type semiconductor layer 213 and the active layer 212 to be connected to the first conductivity type semiconductor layer 211, and an electrode extension part 214b connected to the conductive via 214a. The conductive via 214a may be enclosed by an insulating layer 216 and be electrically separated from the active layer 212 and the second conductivity type semiconductor layer 213. The conductive via 214a may be disposed in an etched region of the semiconductor laminate. The number, shape, or pitch of conductive vias 214a or a contact area thereof with respect to the first conductivity type semiconductor layer 211 may be appropriately designed so as to reduce contact resistance. Further, the conductive vias 214a may be arranged in a matrix form on the semiconductor laminate, whereby a current flow may be improved.

The second electrode pad 215 may include an ohmic contact layer 215a and an electrode extension part 215b on the second conductivity type semiconductor layer 213.

An LED chip 310 shown in FIG. 11 may include a growth substrate 301, a first conductivity type semiconductor base layer 311 formed on the growth substrate 301, and a plurality of light emitting nanostructures 312 formed on the first conductivity type semiconductor base layer 311. In addition, the LED chip 310 may further include an insulating layer 313 and a filling part 316.

Each of the light emitting nanostructures 312 may include a first conductivity type semiconductor core 312a, and an active layer 312b and a second conductivity type semiconductor layer 312c sequentially formed on a surface of the core 312a as shell layers. The exemplary embodiment illustrates a case in which the light emitting nanostructures 312 have a core-shell structure, but the present configuration is not limited thereto. The light emitting nanostructures 312 may have other structures, such as a pyramid structure and the like.

The first conductivity type semiconductor base layer 311 may provide a growth surface for growth of the light emitting nanostructure 312. The insulating layer 313 may provide open regions for the growth of the light emitting nanostructures 312 and may be formed of a dielectric material, such as $SiO_2$ or $SiN_x$. The filling part 316 may structurally stabilize the light emitting nanostructures 312 and allow light to pass therethrough or to be reflected therefrom. In a case in which the filling part 316 contains a -light-transmissive material, the filling part 316 may be formed of a transparent material such as $SiO_2$, SiNx, elastic resin, silicon, epoxy resin, polymer or plastics. If necessary, in a case in which the filling part 316 contains a reflective material, the filling part 316 may be formed by using a metal power or ceramic powder having a high degree of reflectance in a polymer material such as polypthalamide (PPA). The ceramic powder having a high degree of reflectance may be at least one selected from a group consisting of $TiO_2$, $Al_2O_3$, $Nb_2O_5$, $Al_2O_3$ and ZnO. A high reflective metal may be used and for example, a metal such as Al or Ag may be used.

First and second electrode pads 314 and 315 may be disposed on lower surfaces of the light emitting nanostructures 312. The first electrode pad 314 may be positioned on an exposed surface of the first conductivity type semiconductor base layer 311, and the second electrode pad 315 may include an ohmic contact layer 315a and an electrode extension part 315b formed downwardly of the light emitting nanostructures 312 and the filling part 316. Unlike this, the ohmic contact layer 315a and the electrode extension part 315b may be integrally formed.

As set forth above, according to exemplary embodiments, a light measuring system allowing for measurement automation by positioning a light source outwardly of an integrating sphere while increasing a degree of accuracy by blocking light from being emitted outwardly may be provided.

While exemplary embodiments have been shown and described above, it will be apparent to those skilled in the art that modifications and variations could be made without departing from the scope of the invention as defined by the appended claims.

What is claimed is:

1. A light measuring system comprising:
   an integrating sphere comprising an aperture;

a support part comprising at least one light source mounting block having a light source mounting region configured to mount a light source thereon, the support part configured to align the light source mounting region with the aperture of the integrating sphere;
a light meter configured to measure a light characteristic of light emitted by the light source; and
a reflector disposed between the aperture of the integrating sphere and the light source mounting block, the reflector comprising a plurality of reflector plates arranged around the light source mounting region,
wherein the plurality of reflector plates comprises:
a pair of first reflector plates opposing each other and mounted on the light source mounting block, the pair of first reflector plates being arranged in a first direction that is a direction of movement of the light source mounting block, and the light source mounting region being interposed between the pair of first reflector plates; and
a pair of second reflector plates opposing each other and mounted on the integrating sphere, the pair of second reflector plates being arranged in a second direction perpendicular to the first direction, and the aperture being interposed between the pair of second reflector plates.

2. The light measuring system of claim 1, wherein the pair of first reflector plates and the pair of second reflector plates are configured to allow for a movement path of the light source mounting block.

3. The light measuring system of claim 1, wherein the first reflector plates are mounted on the light source mounting block at an angle inclined toward the integrating sphere.

4. The light measuring system of claim 1, wherein the second reflector plates are extended from the integrating sphere to the support part, and
wherein the second reflector plates are mounted on the integrating sphere at an angle such that a distance between the second reflector plates at a point of mounting to the integrating sphere is less than a distance between distal ends of the second reflector plates.

5. The light measuring system of claim 1, wherein a distance between the second reflector plates is greater than widths of the first reflector plates.

6. The light measuring system of claim 1, wherein the support part comprises a plurality of light source mounting blocks, the support part configured such that light source mounting regions of respective light source mounting blocks are sequentially aligned with the aperture of the integrating sphere.

7. The light measuring system of claim 6, wherein the support part further comprises a rotatably driven rotating body, and the plurality of light source mounting blocks are radially arranged in a circumferential portion of the rotating body.

8. The light measuring system of claim 6, further comprising a driving device connected to the rotating body and configured to rotate the rotating body to align the light source mounting regions of respective light source mounting blocks with the aperture of the integrating sphere.

9. The light measuring system of claim 1, wherein the light source comprises a light emitting diode (LED) chip or an LED package in which the LED chip is mounted.

10. The light measuring system of claim 9, wherein the light source further comprises a wavelength conversion layer covering the LED chip.

11. A light measuring system comprising:
an integrating sphere comprising an aperture;
a support part comprising a plurality of light source mounting blocks respectively comprising light source mounting regions configured to mount a light source thereon, the support part configured to move the plurality of light source mounting blocks along a first direction and align the respective light source mounting regions with the aperture of the integrating sphere;
a light meter configured to measure a light characteristic of light emitted by the light sources; and
a reflector comprising:
first reflector plates disposed in each of the plurality of light source mounting blocks and arranged in the first direction; and
second reflector plates disposed on the integrating sphere around the aperture and arranged in a second direction perpendicular to the first direction.

12. The light measuring system of claim 11, wherein the first reflector plates and the second reflector plates are separated from each other.

13. A light measuring system comprising:
an integrating sphere, the integrating sphere comprising an aperture, the aperture comprising a first pair of opposing reflectors extending from the integrating sphere at an angle and converging towards each other;
a light source mounting block comprising:
a second pair of opposing reflectors extending from the light source mounting block at an angle and diverging away from each other; and
a light source mounted between the second pair of opposing reflectors,
wherein parallel edges of the first pair of opposing reflectors selectively align with parallel edges of the second pair of opposing reflectors.

14. The light measuring apparatus of claim 13, further comprising:
a circular support configured to be rotated about a central axis,
wherein the light source mounting block is mounted to the circular support.

15. The light measuring apparatus of claim 14, wherein the light source mounting block comprises:
a first light source mounting block mounted to the circular support at a first position, the first light source mounting block comprising:
one second pair of the opposing reflectors extending from the first light source mounting block and converging towards each other; and
a first light source mounted between the one second pair of the opposing reflectors of the first light source mounting block; and
a second light source mounting block mounted to the circular support at a second position, the second light source mounting block comprising:
one second pair of opposing reflectors extending from the second light source mounting block and converging towards each other; and
a second light source mounted between the one second pair of the opposing reflectors of the second light source mounting block.

16. The light measuring apparatus of claim 15, further comprising:
a motor configured to rotate the circular support about the central axis of the circular support to sequentially align:
the one second pair of the opposing reflectors of the first light source mounting block with the first pair of opposing reflectors, the aligned one second pair of the opposing reflectors of the first light source mounting block and the first pair of opposing reflectors substantially enclosing the first light source; and the one second pair of the opposing reflectors of the second light source mounting block with the first pair of opposing reflectors, the aligned one second pair of the opposing reflectors of the second light source mounting block and the first pair of opposing reflectors substantially enclosing the second light source.

17. The light measuring apparatus of claim 16, further comprising:

a light meter configured to measure at least one light characteristic of:

light emitted into an interior surface of the integrating sphere via the aperture by the first light source when the one second pair of the opposing reflectors of the first light source mounting block are aligned with the first pair of opposing reflectors; and light emitted into the interior surface of the integrating sphere via the aperture by the second light source when the one second pair of the opposing reflectors of the second light source mounting block are aligned with the first pair of opposing reflectors.

* * * * *